(12) United States Patent
Garcia et al.

(10) Patent No.: US 9,300,741 B2
(45) Date of Patent: *Mar. 29, 2016

(54) CONTENT SURFACING BASED ON GEO-SOCIAL FACTORS

(71) Applicant: Facebook, Inc., Menlo Park, CA (US)

(72) Inventors: David Harry Garcia, Sunnyvale, CA (US); Samuel Odio, Portola Valley, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/221,123

(22) Filed: Mar. 20, 2014

(65) Prior Publication Data

US 2014/0207866 A1  Jul. 24, 2014

Related U.S. Application Data

(63) Continuation of application No. 13/275,060, filed on Oct. 17, 2011, now Pat. No. 8,725,168.

(51) Int. Cl.
*H04W 24/00* (2009.01)
*H04L 29/08* (2006.01)
*H04W 4/02* (2009.01)
*G01C 21/34* (2006.01)
*G06Q 50/00* (2012.01)
*H04W 4/20* (2009.01)

(52) U.S. Cl.
CPC ............ *H04L 67/18* (2013.01); *G01C 21/3484* (2013.01); *G06Q 50/01* (2013.01); *H04L 67/02* (2013.01); *H04W 4/02* (2013.01); *H04W 4/206* (2013.01)

(58) Field of Classification Search
CPC .......... H04L 67/18; H04L 67/02; H04W 4/02; H04W 4/206; G01C 21/3484; G06Q 50/01
USPC .......... 455/456.1, 456.3, 550.1; 701/446, 408, 701/409
See application file for complete search history.

(56) References Cited

U.S. PATENT DOCUMENTS

| 7,529,639 | B2 | 5/2009 | Rasanen | |
|---|---|---|---|---|
| 8,311,950 | B1 * | 11/2012 | Kunal | G06Q 30/0201 705/319 |
| 8,725,168 | B2 * | 5/2014 | Garcia et al. | 455/456.1 |
| 2006/0069503 | A1 | 3/2006 | Suomela | |
| 2006/0229802 | A1 | 10/2006 | Vertelney | |
| 2007/0005419 | A1 * | 1/2007 | Horvitz et al. | 705/14 |

(Continued)

FOREIGN PATENT DOCUMENTS

| JP | 2012-123490 A | 6/2012 |
|---|---|---|
| KR | 10-2010-0062073 A | 6/2010 |

(Continued)

OTHER PUBLICATIONS

International Search Report and Written Opinion for International Application PCT/US2012/054975, Mar. 13, 2013.

(Continued)

*Primary Examiner* — Khai M Nguyen
(74) *Attorney, Agent, or Firm* — Baker Botts L.L.P.

(57) ABSTRACT

In one embodiment, a geo-social networking system determines a user's current location, calculates a novelty score for the location representing the user's degree of familiarity, and surfaces content within a geographic and temporal radius based on the novelty score for display to the user.

20 Claims, 6 Drawing Sheets

(56) References Cited

U.S. PATENT DOCUMENTS

| | | | |
|---|---|---|---|
| 2008/0086261 A1 | 4/2008 | Robinson | |
| 2008/0214210 A1* | 9/2008 | Rasanen | H04W 4/02 455/456.3 |
| 2008/0288165 A1* | 11/2008 | Suomela | G01C 21/3641 701/533 |
| 2009/0215427 A1 | 8/2009 | Hawkins | |
| 2010/0058196 A1* | 3/2010 | Krishnan | G06Q 10/10 715/747 |
| 2011/0238476 A1* | 9/2011 | Carr et al. | 705/14.25 |

FOREIGN PATENT DOCUMENTS

| | | |
|---|---|---|
| WO | WO 03/004654 | 7/2003 |
| WO | 2010-140504 A1 | 12/2010 |

OTHER PUBLICATIONS

Australian Government, IP Australia, Patent Examination Report No. 1, Jun. 19, 2014.

Canadian Intellectual Property Office, Patent Examination Communication, Jun. 19, 2014.

Extended European Search Report for EP 128418779.9-1853, Jul. 3, 2015.

Office Action for IL Application 232184 (no translation), Jun. 16, 2014.

Office Action for KR Application No. 10-2014-7012894 (with English translation), Sep. 2, 2014.

Office Action for JP Application No. 2014-537068 (with English translation), Sep. 9, 2014.

* cited by examiner

CONTENT SURFACING BASED ON GEO-SOCIAL FACTORS

PRIORITY

This application is a continuation under 35 U.S.C. §120 of U.S. patent application Ser. No. 13/275,060, filed 17 Oct. 2011, which is incorporated herein by reference.

TECHNICAL FIELD

The present disclosure relates generally to a geo-social networking service and, more particularly, to surfacing content to a device based on geo-social factors.

BACKGROUND

A social networking system, such as a social networking website, enables its users to interact with it and with each other through the system. The social networking system may create and store a record, often referred to as a user profile, in connection with the user. The user profile may include a user's demographic information, communication channel information, and personal interest. The social networking system may also create and store a record of a user's relationship with other users in the social networking system (e.g., social graph), as well as provide services (e.g., wall-posts, photo-sharing, or instant messaging) to facilitate social interaction between users in the social networking system. A geo-social networking system is a social networking system in which geographic services and capabilities are used to enable additional social interactions. User-submitted location data or geo-location techniques (e.g., mobile phone position tracking) can allow a geo-social network to connect and coordinate users with local people or events that match their interests. For example, users can check-in to a place using a mobile client application by providing a name of a place (or selecting a place from a pre-established list of places). The geo-social networking system, among other things, can record information about the user's presence at the place and possibly provide this information to other users of the geo-social networking system.

SUMMARY

Particular embodiments relate to a geo-social networking system that includes features directed to automatically surfacing content related to the current location of a client device based on various geo-social factors. These and other features, aspects, and advantages of the disclosure are described in more detail below in the detailed description and in conjunction with the following figures.

DETAILED DESCRIPTION

Figure 1:
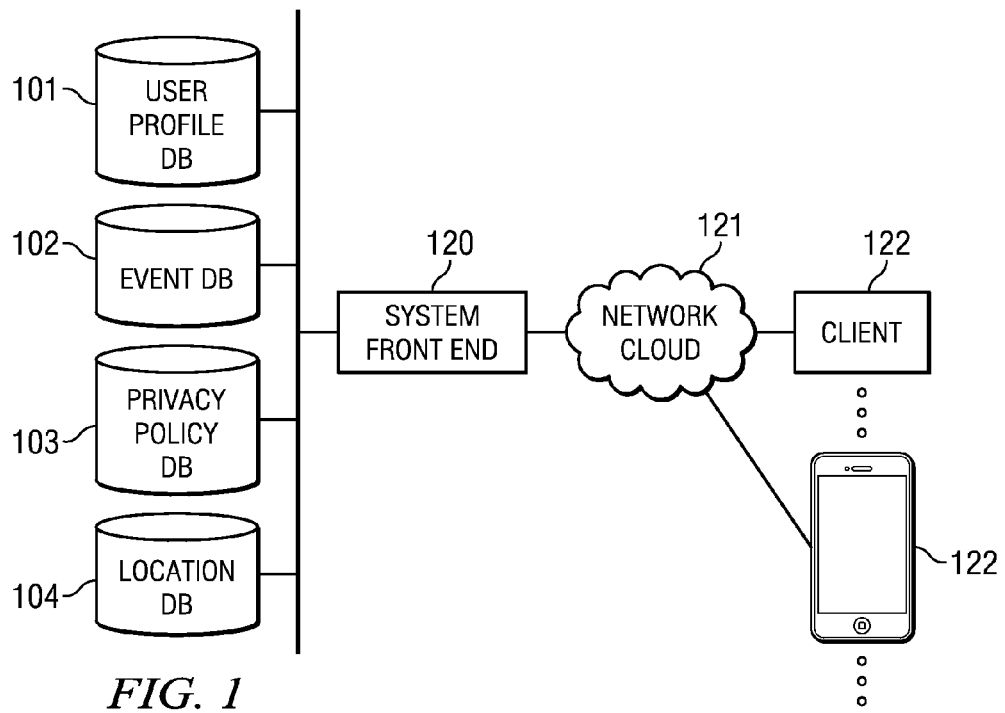
FIG. 1 illustrates an example social networking system.

The invention is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A social networking system, such as a social networking website, enables its users to interact with it, and with each other through, the system. Typically, to become a registered user of a social networking system, an entity, either human or non-human, registers for an account with the social networking system. Thereafter, the registered user may log into the social networking system via an account by providing, for example, a correct login ID or username and password. As used herein, a "user" may be an individual (human user), an entity (e.g., an enterprise, business, or third party application), or a group (e.g., of individuals or entities) that interacts or communicates with or over such a social network environment.

When a user registers for an account with a social networking system, the social networking system may create and store a record, often referred to as a "user profile", in connection with the user. The user profile may include information provided by the user and information gathered by various systems, including the social networking system, relating to activities or actions of the user. For example, the user may provide his name, profile picture, contact information, birth date, gender, marital status, family status, employment, education background, preferences, interests, and other demographical information to be included in his user profile. The user may identify other users of the social networking system that the user considers to be his friends. A list of the user's friends or first degree contacts may be included in the user's profile. Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time.

The user may also update his or her profile information at any time. For example, when the user moves, or changes a phone number, he may update his contact information. Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages—typically known as wall-posts. A user may also input status messages that get posted to the user's profile page.

A social network system may maintain social graph information, which can generally model the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

A social networking system may support a variety of applications, such as photo sharing, on-line calendars and events. For example, the social networking system may also include media sharing capabilities. For example, the social networking system may allow users to post photographs and other multimedia files to a user's profile, such as in a wall post or in a photo album, both of which may be accessible to other users of the social networking system. Social networking system may also allow users to configure events. For example, a first user may configure an event with attributes including time and date of the event, location of the event and other users invited to the event. The invited users may receive invitations to the event and respond (such as by accepting the invitation or declining it). Furthermore, social networking system may allow users to maintain a personal calendar. Similarly to events, the calendar entries may include times, dates, locations and identities of other users.

The social networking system may also support a privacy model. A user may or may not wish to share his information with other users or third-party applications, or a user may wish to share his information only with specific users or third-party applications. A user may control whether his information is shared with other users or third-party applications through privacy settings associated with his user profile. For example, a user may select a privacy setting for each user datum associated with the user and/or select settings that apply globally or to categories or types of user profile information. A privacy setting defines, or identifies, the set of entities (e.g., other users, connections of the user, friends of friends, or third party application) that may have access to the user datum. The privacy setting may be specified on various levels of granularity, such as by specifying particular entities in the social network (e.g., other users), predefined groups of the user's connections, a particular type of connections, all of the user's connections, all first-degree connections of the user's connections, the entire social network, or even the entire Internet (e.g., to make the posted content item indexable and searchable on the Internet). A user may choose a default privacy setting for all user data that is to be posted. Additionally, a user may specifically exclude certain entities from viewing a user datum or a particular type of user data.

Social networking system may maintain a database of information relating to geographic locations or places. Places may correspond to various physical locations, such as restaurants, bars, train stations, airports and the like. Some places may correspond to larger regions that themselves contain places—such as a restaurant or a gate location in an airport. In one implementation, each place can be maintained as a hub node in a social graph or other data structure maintained by the social networking system, as described in U.S. patent application Ser. No. 12/863,181, which is incorporated by reference herein for all purposes. Social networking system may allow users to access information regarding each place using a client application (e.g., a browser) hosted by a wired or wireless station, such as a laptop, desktop or mobile device. For example, social networking system may serve web pages (or other structured documents) to users that request information about a place. In addition to user profile and place information, the social networking system may track or maintain other information about the user. For example, the social networking system may support geo-social networking system functionality including one or more location-based services that record the user's location. For example, users may access the geo-social networking system using a special-purpose client application hosted by a mobile device of the user (or a web- or network-based application using a browser client). The client application may automatically access Global Positioning System (GPS) or other geo-location functions supported by the mobile device and report the user's current location to the geo-social networking system. In addition, the client application may support geo-social networking functionality that allows users to check-in at various locations and communicate this location to other users. A check-in to a given place may occur when a user is physically located at a place and, using a mobile device, access the geo-social networking system to register the user's presence at the place. A user may select a place from a list of existing places near to the user's current location or create a new place. The user may also provide comments in a text string when checking in to a given place. The user may also identify one or more other users in connection with a check-in (such as friends of a user) and associate them with the check-in as well. U.S. patent application Ser. No. 12/584,614, which is incorporated by reference herein for all purposes, describes a system that allows a first user to check-in other users at a given place. An entry including a comment and a time stamp corresponding to the time the user checked in may be displayed to other users. For example, a record of the user's check-in activity may be stored in a database. Social networking system may select one or more records associated with check-in activities of users at a given place and include such check-in activity in web pages (or other structured documents) that correspond to a given place. For example, social networking system may select the check-in activity associated with the friends or other social contacts of a user that requests a page corresponding to a place. U.S. application Ser. No. 12/858,817, incorporated by reference in its entirety for all purposes, describes an example geo-social networking system that can be used in connection with various embodiments of the present invention. The check-in activity may also be displayed on a user profile page and in news feeds provided to users of the social networking system.

Still further, a special purpose client application hosted on a mobile device of a user may be configured to continuously capture location data of the mobile device and send the location data to social networking system. In this manner, the social networking system may track the user's location and provide various recommendations to the user related to places that are proximal to the user's path or that are frequented by the user. In one implementation, a user may opt in to this recommendation service, which causes the client application to periodically post location data of the user to the social networking system.

Still further, particular embodiments allow the social networking system to surface various pieces of content based on the current location of a device associated with a particular user or member of the social network, aggregate amount of time spent by the user in the current location, and the distance between the previously determined location and the current location of the device. Based on these factors, the social networking system may determine the "novelty" of the current location to the user of the client device, and cast a wider or narrower net geographically and temporally for surfaced content. For example, if a user is in a location where he or she has spent little to no time, the social networking system may surface content from the entire region, state, or country of the location. Furthermore, if the user has spent little or no time in a particular location, content may be surfaced from any date in the past. However, if the user has spent a significant amount of time in a particular location, the social networking system determines that the location is not novel to the user, and surfaces content only related to a small geographic radius, and posted to the social network in the last few days.

Content may be anything existing on the social network related to the location, including without limitation: photos, videos, stories, check-ins, comments, reviews, news entries, links, events, audio, deals, promotions, ads, and the like. In particular embodiments, the content replaces the home screen, background screen, lock screen, or other default screens of the user's mobile device. In particular embodiments, the content is generated as a custom news feed for the location.

In particular embodiments, content matching the search radius is ranked based on social relevancy, and displayed to the user in order of descending social relevancy. Multiple factors may be taken into account when determining social relevancy, including without limitation: the relationship between the user and the user who generated the content, the amount of engagement of the content, and whether the content was uploaded by a friend of another user of the social network who is in the same location as the user.

Thus this disclosure provides users of client devices a manner of physically exploring the social graph by surfacing relevant content based on geo-social factors.

FIG. 1 illustrates an example social networking system. In particular embodiments, the social networking system may store user profile data and social graph information in user profile database 101. In particular embodiments, the social networking system may store user event data in event database 102. For example, a user may register a new event by accessing a client application to define an event name, a time and a location, and cause the newly created event to be stored in event database 102. In particular embodiments, the social networking system may store user privacy policy data in privacy policy database 103. In particular embodiments, the social networking system may store geographic and location data in location database 104. In particular embodiments, databases 101, 102, 103, and 104 may be operably connected to the social networking system's front end. In particular embodiments, the front end 120 may interact with client device 122 through network cloud 121. Client device 122 is generally a computer or computing device including functionality for communicating (e.g., remotely) over a computer network. Client device 122 may be a desktop computer, laptop computer, personal digital assistant (PDA), in- or out-of-car navigation system, smart phone or other cellular or mobile phone, or mobile gaming device, among other suitable computing devices. Client device 122 may execute one or more client applications, such as a web browser (e.g., Microsoft Windows Internet Explorer, Mozilla Firefox, Apple Safari, Google Chrome, and Opera, etc.) or special-purpose client application (e.g., Facebook for iPhone, etc.), to access and view content over a computer network. Front end 120 may include web or HTTP server functionality, as well as other functionality, to allow users to access the social networking system. Network cloud 121 generally represents a network or collection of networks (such as the Internet or a corporate intranet, or a combination of both) over which client devices 122 may access the social network system.

In particular embodiments, location database 104 may store an information base of places, where each place includes a name, a geographic location and meta information (such as the user that initially created the place, reviews, comments, check-in activity data, and the like). Places may be created by administrators of the system and/or created by users of the system. For example, a user may register a new place by accessing a client application to define a place name and provide a geographic location and cause the newly created place to be registered in location database 104. As discussed above, a created place may correspond to a hub node, which an administrator can claim for purposes of augmenting the information about the place and for creating ads or other offers to be delivered to users. In particular embodiments, system front end 120 may construct and serve a web page of a place, as requested by a user. In some embodiments, a web page of a place may include selectable components for a user to "like" the place or check in to the place. In particular embodiments, location database 104 may store geo-location data identifying a real-world geographic location of a user associated with a check-in. For example, a geographic location of an Internet connected computer can be identified by the computer's IP address. For example, a geographic location of a cell phone equipped with cellular, Wi-Fi and/or GPS capabilities can be identified by cell tower triangulation, Wi-Fi positioning, and/or GPS positioning. In particular embodiments, location database 104 may store a geographic location and additional information of a plurality of places. For example, a place can be a local business, a point of interest (e.g., Union Square in San Francisco, Calif.), a college, a city, or a national park. For example, a geographic location of a place (e.g., a local coffee shop) can be an address, a set of geographic coordinates (latitude and longitude), or a reference to another place (e.g., "the coffee shop next to the train station"). For example, a geographic location of a place with a large area (e.g., Yosemite National Park) can be a shape (e.g., a circle, or a polygon) approximating the boundary of the place and/or a centroid of the shape. For example, additional information of a place can be business hours, photos, or user reviews of the place. In particular embodiments, location database 104 may store a user's location data. For example, a user can create a place (e.g., a new restaurant or coffee shop) and the social networking system can store the created place in location database 104. For example, location database 104 may store a user's check-in activities. For example, location database 104 may store a user's geographic location provided by the user's GPS-equipped mobile device. In particular embodiments, the social networking system may calculate one or more routes of a user based on the user's user profile information, check-in activities, and/or geographic location data reported by a client application (see above) and store the one or more routes in location database 104. For example, the social networking system can calculate a "commute route" of a user between the user's home and work (as described in the user's user profile information stored in user profile database 101) by using a mapping service application such as Google Maps, or by using geographic location data points from the user's GPS-equipped mobile phone while the user is driving to work.

Figure 2:
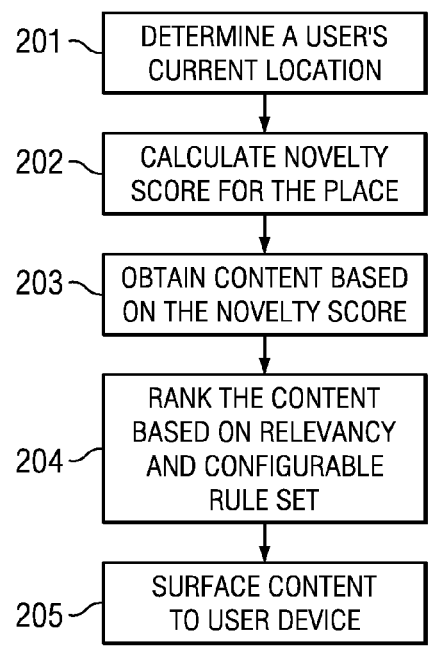
FIG. 2 illustrates an example method of surfacing content to a client device based on geo-social factors.

FIG. 2 illustrates an example method of surfacing content based on geo-social factors in accordance with one embodiments of the invention. FIG. 2 can be implemented by a content surfacing process hosted by one or more computing devices of the social networking system. In particular embodiments, the content surfacing process first determines a user's client device 122's current location (201). For example, the content surfacing process can determine a user's current location based on a geographic location reported by the user's GPS-equipped mobile phone. For example, the content surfacing process can determine a user's current location by accessing event database 102 and determine a current event (e.g., a meeting, a lunch appointment) that the user attends and a location associated with the current event. In particular embodiments, the social networking system may ascertain the location of client device 122 through matching an uploaded photo with a database of known photos via an image object recognition computer vision algorithm. In particular embodiments, the content surfacing process determines the location of client device 122 through assisted GPS or time distance of arrival (TDOA) triangulation. This disclosure contemplates any suitable manner of obtaining the location of client device 122.

At Step 202 the content surfacing process determines a "novelty" score for the location unique to client device 122. The novelty score is an estimation as to how familiar the user of a mobile or client device is with the location. In particular embodiments, the novelty score may be based off a number of geo-social factors. For example, the social networking system may continuously collect location data from a particular user's client device 122 to ascertain the aggregate amount of time a user has spent in a particular location. When the user has spent little or no time in a given location, the social networking system may, in particular embodiments, estimate that the user does not know the area at all, and assign a high novelty score to the location for client device 122. In particular embodiments, a single user may be associated with multiple client devices. For example, a user may log in from a desktop or notebook computer. In such a case, the IP address may be mapped to a physical location, and the social network may assume the user is in that location. In particular embodiments, the social networking system may parse the user's profile information for self-declared location information, including but not limited to: the user's current city, the user's hometown, the user's cities of education, and the user's cities of employment. Generally speaking the novelty score decreases as the user spends more time in a given location.

On the other hand, if the social networking system has found that the user has spent several years in the same location, the social networking system may estimate that the user lives in the area and knows it well; consequently the social networking system may assign a low novelty score to the location for client device 122. In particular embodiments, the social networking system takes into account, in addition to the aggregate amount of time spent in the location, the last time the user was detected in the location. For example, if a user is visiting an area that he or she has spent a great deal of time in, but has not visited recently, the social networking system may increase the novelty score accordingly.

In particular embodiments, the novelty score is based on the distance ("$\Delta d$") between the most recent previously-determined position of client device 122 and the current location of client device 122. For example, where a user travels from San Francisco, Calif., to Barcelona, Spain, upon powering up his or her device in Spain, the social networking system determines that $\Delta d$ is 5,962 miles, and will accordingly increase the novelty score for the current location. In particular embodiments, other geo-social factors may be accounted for in the novelty score. In particular embodiments, information may be mined from the user's personal profile to calculate the novelty score. If, for example, a user's employment history states that he was employed in the current location, the social networking system may utilize this information, as well as the length of employment, to adjust the novelty score for the location. In particular embodiments, if the user has been tagged in a photo in the location, the social networking system accordingly reduces the novelty score for the location. In particular embodiments, if the user has granted the social network to other social networks services, e-mail services, or other cloud-based computing services, the social networking system may mine the user's data to ascertain whether the user has previously visited the current location. In particular embodiments, the aggregate time spent is weighted heavier than the $\Delta d$ value in calculating the novelty score. This disclosure contemplates any suitable manner of calculating a novelty score, and utilizing any combination of social factors or weighting in the novelty score calculation.

The novelty score calculated in Step 202 is utilized to determine what content to surface to the user. In particular embodiments, content existing on the social network one or both location and time uploads. For example, uploaded photographs may be associated with a physical location on the social network. In particular embodiments, photographs are associated with a physical location based on EXIF location data. In particular embodiments, uploaded photographs are associated with a particular physical location through matching the photos with a database of photos having a known geographic location via a computer vision algorithm. Similarly, uploaded photos may include EXIF data including the date and time of capture. Alternatively, the social networking system may timestamp the uploaded photograph with the date and time of upload.

Because it is desirable for the content surfacing process to deliver content to the user that is relevant to the user, in particular embodiments, the granularity of the delivered content is inversely correlated with the novelty score for the location. In particular embodiments, the granularity of delivered content is defined by a geographic radius from the location and a temporal duration from the current time. For example, where a user is completely unfamiliar with an area (high novelty score), the content surfacing process will pull content from a large geographic radius, such as the entire region, state, or country containing the location. Similarly, where a user is unfamiliar with an area, the content surfacing system will pull content from a large temporal duration, for example, all content, regardless of the timestamp. On the other hand, if a user is in an area he or she knows well (low novelty score), the content surfacing process may only deliver content within a small geographic area (such as within 100 feet) and occurring within a short temporal duration (for example, within the last 24 hours). Thus the content surfacing process delivers relevant content to the user that is tailored to his estimated familiarity of his or her present location. In particular embodiments, the granularity is inversely correlated with the novelty score. In particular embodiments, the granularity is nonlinearly inversely correlated with the novelty score. In particular embodiments, the granularity is weighted unevenly between the multiple factors. In particular embodiments, the content surfacing system is not limited to filtering content by geographic radius and temporal duration. In particular embodiments, a particular city or region may be segmented into any arbitrary region, such as a neighborhood or district. This disclosure contemplates any suitable manner of filtering the content to be surfaced.

At Step 203, the content surfacing process retrieves content that falls within the geographic and temporal radius determined based on the novelty score calculated in Step 202. As previously disclosed, the geographic radius need not be limited to a circular radius. In particular embodiments, any arbitrary geographic area may be utilized to filter surfaced content. As previously stated, "content" comprises any type of information stored on the social networking system. For example, photos that were captured within the geographic area and uploaded by friends of the user, check-ins by friends of the user to locations falling within with the geographic area, reviews of businesses or entities in the geographic area by friends of the user, comments on pages associated with locations falling within the geographic area by the friends of the users, pages associated with locations within the geographic area, and comments including text associated with locations within the geographic area. This disclosure contemplates delivering any type of information from the social networking system to the user as surfaced content.

In Step 204, the list of content to be surfaced is ranked by the content surfacing processing based on distance, relevancy, and other geo-social factors. For example, the content surfacing process can rank the list of content based on a distance between location associated with the content and the user's current location by arranging the content closest to the user's current location to the top of the list. In particular embodiments, the social networking system calculates a social coefficient representing how close two individual users are on the social network, based on demographic factors, mutual friends, and the degree of interaction between the two users, and pushes content uploaded or associated with users having a higher social coefficient with the user to the top of the list. In particular embodiments, highly engaged content, such as photos that have been highly commented on or highly liked, are ranked higher. In particular embodiments, the content surfacing process ranks content published by friends of another user in the same location as the user of client device 122 are ranked higher. For example, if user A and user B are at the same location at the same time, content published by the friends of user B are surfaced to user A, and vice versa.

At Step 205 the content surfacing process delivers the content to the client device 122. In particular embodiments, the delivered content may take the form of a customized "news feed" on the user's client device 122. In particular embodiments, the surfaced content may be a photo slideshow that replaces the lock screen, screen saver, desktop background, or any other default screen of client device 122. In particular embodiments, the surfaced content may be delivered to the user in the form of a map having "pins" designating the location of each piece of content. In particular embodiments, these pins may also designate the type of story or content at a given location. In particular embodiments, content may be delivered to client device 122 through a notifications indicator. For example, a user may receive a selectable notification, that when selected, displays the delivered content. In particular embodiments, the notification system operates in real-time; the user receives a notification as soon as the relevant content is generated on the social networking system. In particular embodiments, the notifications are based on a specific geographic radius surrounding the location of client device 122. In particular embodiments, the radius may be 10 meters, and as a user approaches a geographic location where a particular piece of relevant content was created, the user receives a notification. For example, as a user is walking past a particular restaurant that is associated with a review created by one of the user's friends, he or she may receive a notification displaying the review. This disclosure contemplates any suitable manner of delivering and displaying surfaced content to the user through client device 122.

Figure 3:
FIG. 3 illustrates example traveler and content search radii.

FIG. 3 depicts an example traveler utilizing the content surfacing process in accordance with one embodiment of the invention. Assume a hypothetical traveler is based in San Francisco, and therefore, the novelty score for San Francisco for the hypothetical user is extremely low. When the user powers up his or her phone upon landing in Barcelona 301, the content surfacing process calculates a relevancy score for Barcelona based on the distance traveled from the user's last location and the aggregate time spent in Barcelona. In this example, the novelty score is high, and therefore the granularity is extremely low. Thus, the temporal and geographical radius 301a from which to pull content is extremely large. Therefore, the user is displayed content and points of interest from an area that may cover all of Spain, Portugal, Morocco, and parts of France. Similarly, because the user is unfamiliar with the area, the content surfacing system may deliver content from any time period, for example, a photo from a friend who visited Barcelona three years ago.

Figure 4:
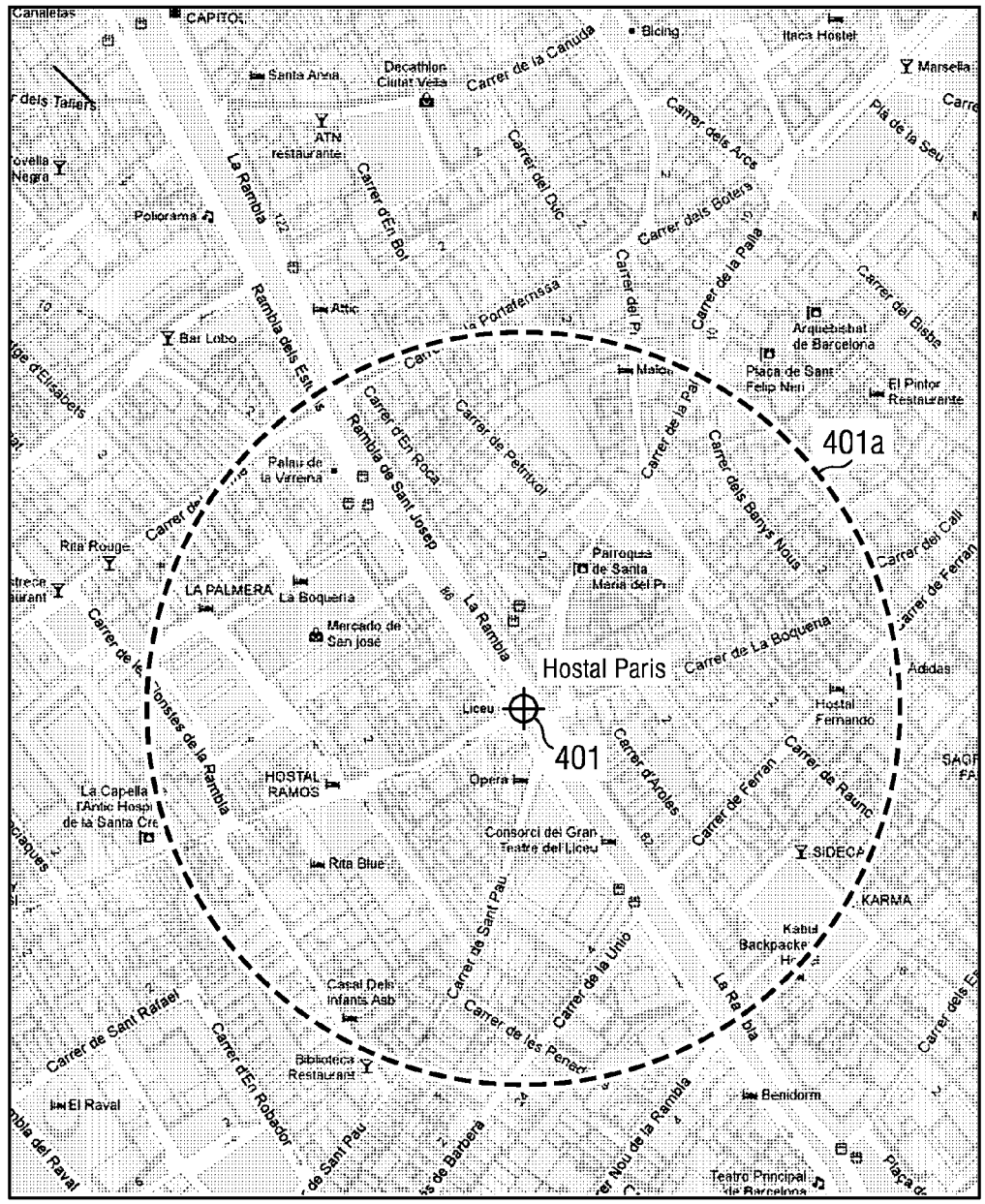
FIG. 4 illustrates example traveler and content search radii as the content granularity increases.

However, as the hypothetical travel remains in Barcelona for an extended period of time, the content surfacing process determines that Barcelona is less novel to the user, and increases the granularity of the content to be surfaced to the user. As shown in FIG. 4, as the user spends more time within the Las Ramblas district 401 of Barcelona, the geographic and temporal search area 401a for content to be surfaced is dramatically reduced. As previously discussed, geographic search area 401 may take any arbitrary shape, such as the neighborhood encompassing Las Ramblas. If the hypothetical user was to remain in the same area, search area 401 would be reduced in geographic and temporal radius until, in particular embodiments, only content relating to locations within a few hundred feet and occurring a few days prior is displayed to the user.

Referring back to FIG. 3, if the hypothetical traveler moves to Madrid 302, geographic and temporal search radius 302b is re-centered around Madrid. Although the user may have a low aggregate amount of time spent in Madrid, the geographic and temporal search area is not increased again to the size of 301a, because the distance between Madrid and Barcelona is far smaller than between San Francisco and Barcelona. Thus, the content surfacing process displays content relating to Madrid, rather than all of Spain, to the user.

Figure 5:
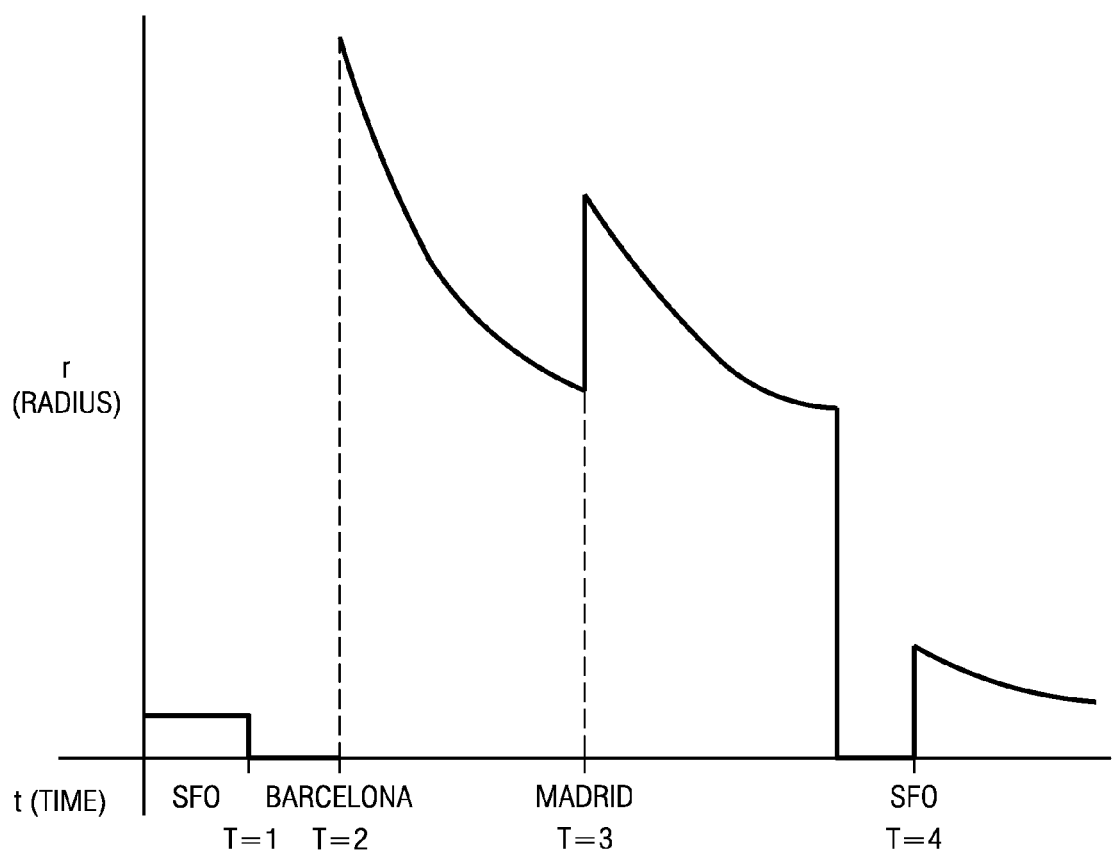
FIG. 5 illustrates an example relationship between the content search radii and time/distance for the example traveler of FIGS. 3 and 4.

FIG. 5 depicts an example relationship between the geographic and temporal search radius versus time for the hypothetical traveler of FIGS. 3 and 4. Prior to T=1, the user's location indicates he or she is in San Francisco, and because the user has spent a large amount of aggregate time in San Francisco, the initial geographic and temporal search radius is extremely small. Thus, while in San Francisco, the content surfacing process delivers extremely granular stories to the user, such as photos from a party down the street from the previous evening.

At T=1, the user powers down his or her client device 122 to fly from San Francisco to Barcelona. Upon powering up client device 122 at T=2, the social networking system calculates a novelty score based upon at least the aggregate amount of time the user has spent in Barcelona and the difference in position from the previously reported location and the current location. In this example, because the distance is large and the aggregate amount of time is small, the novelty is high, and therefore, the search area, both geographically and temporally, is extremely large. Thus, the content surfacing system shows, in particular embodiments, photos posted by the user's friends at any date from all of Spain. As the user spends more time in Barcelona, the geographic and temporal search radius progressively decreases.

At T=2, the user travels to Madrid, and the content surfacing process calculates a new novelty score for Madrid for the user. Because the user has not been in Madrid before, but because the delta between his or her last location (Barcelona) and current location is relatively small, the search radius increases slightly and is re-centered around Madrid. In particular embodiments, the content surfacing process takes into account the distance traveled over time. For example, when traveling via plane, the distance traveled over time is very high, and thus, the user is less likely to be familiar with the area. However, when traveling by car or train, the distance traveled over time is relatively low, so the user is more likely to be familiar with the area. In particular embodiments, the content surfacing process recalculates the novelty score any time the user has moved beyond a given distance. In particular embodiments, the content surfacing process continuously calculates a novelty score for the current location of client device 122, and utilizes a sliding window for distance traveled over time to determine whether the user is in transit. As when the hypothetical traveler was in Barcelona, as the user spends more and more time in Madrid, the geographic and temporal search radius decreases at a linear or nonlinear rate.

At T=4, the user arrives back in San Francisco. In particular embodiments, the search radius returns to the previous level (prior to T=1). In particular embodiments, as shown in FIG. 5, only the temporal search radius increases. Thus, the content surfacing process shows the user the content that was generated since the time that the user left.

Figure 6A:
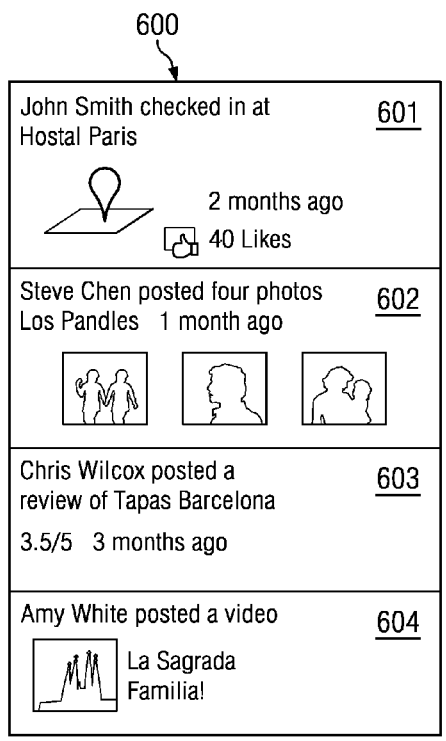
FIGS. 6A-6C illustrate different interfaces for surfacing content.
Figure 6B:
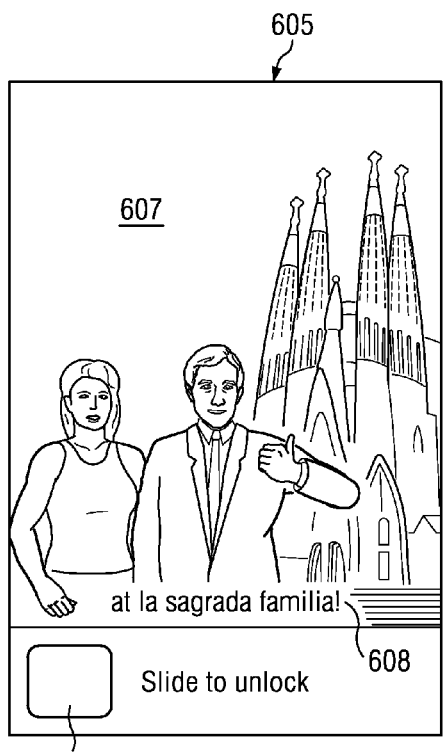
Figure 6C:
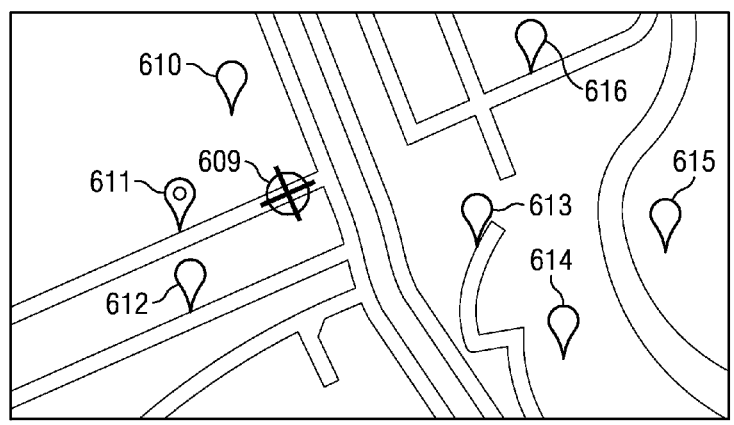

FIGS. 6a, 6b, and 6c depict various interfaces for displaying surfaced content on client device 122. FIG. 6a depicts an example custom news feed 600. In particular embodiments, the custom news feed 600 may be accessed by the user via a specialized tab on a client application that connects to the social networking system. In particular embodiments, the custom news feed 600 may be accessed by navigating to a particular web page. Custom news feed 600 includes surfaced content in the form of news feed entries 601, 602, 603, and 604. In particular embodiments, the entries may correspond to check in 602, photo story 602, review 603, and video 604, posted by the friends of the user or second degree connections of the user. In particular embodiments, the second degree connections are friends with another friend of the user who is traveling with the user.

FIG. 6b depicts an example unlock screen 605 as a method of delivering surfaced content. In particular embodiments, when client device 122 is locked, the device renders an unlock screen 605 on its touchscreen, including a button 606 that a user must swipe in a particular direction to unlock the device for use. In particular embodiments, a slideshow of the most popular photos 608 from that location and uploaded by the user's friends is rendered on the unlock screen. The photo may also include the caption 608, the names of the tagged users, and the tagged object, if applicable. In particular embodiments, the slideshow replaces any number of default screens on client device 122, such as the desktop background.

FIG. 6c depicts another example method of displaying surfaced stories. In FIG. 6C, client device 122 displays an interactive map of the area surrounding the user's location 609. On this map are pins 611-616, each pin corresponding to a story or piece of content that was generated at the location indicated by the pin. In particular embodiments, the user may click, tap, or select a pin to view the story in detail. In particular embodiments, each pin is colored or designed differently to indicate the type of story (photo, video, review, check-in, etc.). This disclosure contemplates any manner of displaying surfaced content to a user of client device 122.

Figure 7:
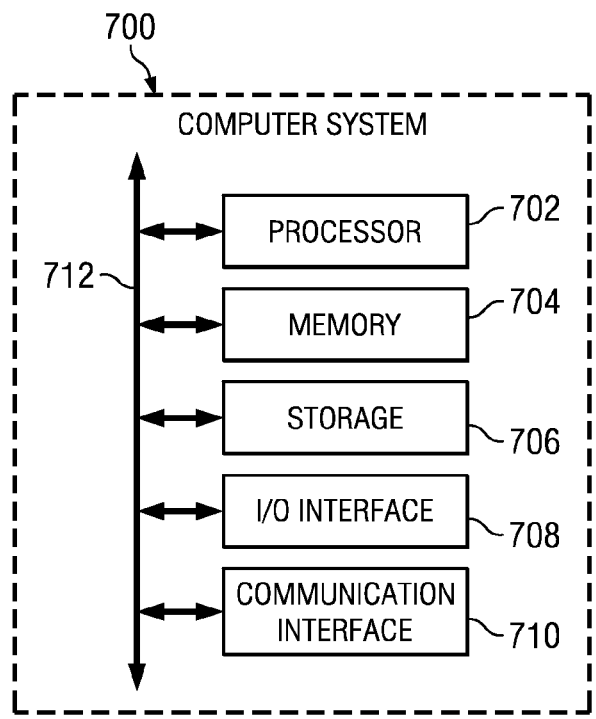
FIG. 7 illustrates an example computer system.

FIG. 7 illustrates an example computer system 700, which may be used with some embodiments of the present invention. This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 700 may include one or more computer systems 700; be unitary or distributed; span multiple locations; span multiple machines; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 708. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 704 may include one or more memories 702, where appropriate. Although this disclosure describes and illustrates particular memory, this disclosure contemplates any suitable memory.

In particular embodiments, storage 706 includes mass storage for data or instructions. As an example and not by way of limitation, storage 706 may include an HDD, a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network (such as, for example, a 702.11a/b/g/n WI-FI network, a 702.11s mesh network), a WI-MAX network, a cellular telephone network (such as, for example, a Global System for Mobile Communications (GSM) network, an Enhanced Data Rates for GSM Evolution (EDGE) network, a Universal Mobile Telecommunications System (UMTS) network, a Long Term Evolution (LTE) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. Bus 712 may include one or more buses 712, where appropriate. This disclosure contemplates any suitable bus or interconnect.

Figure 8:
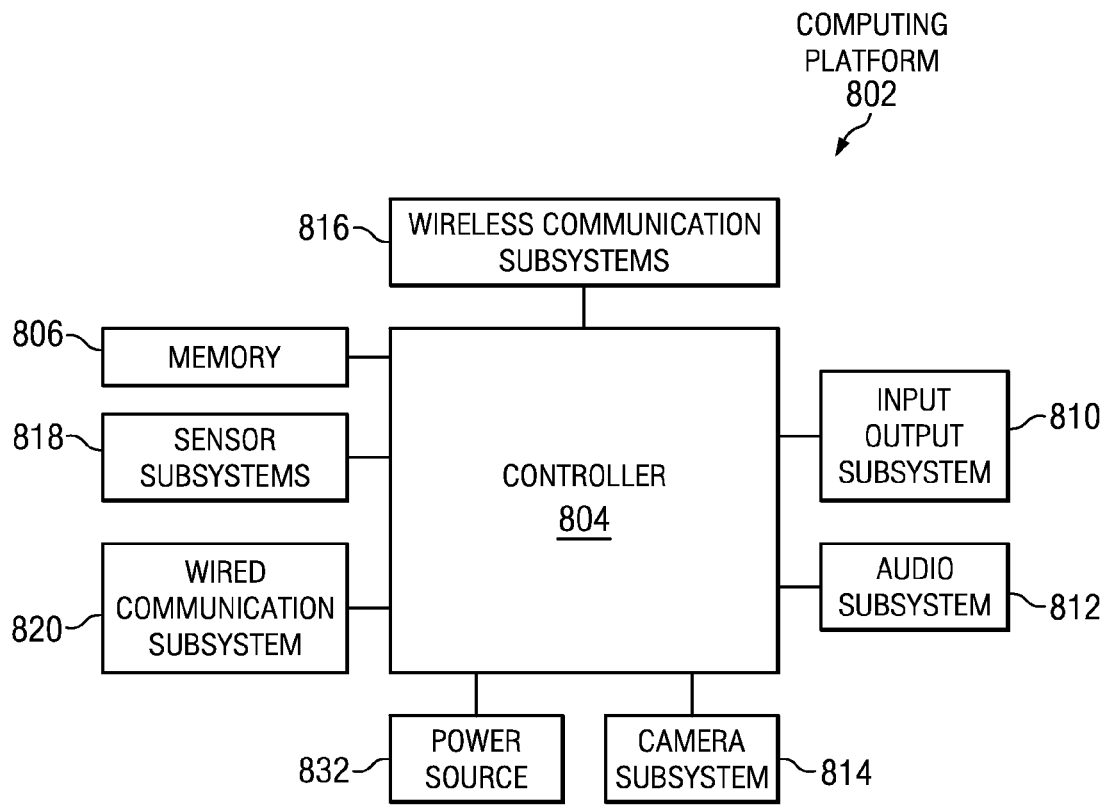
FIG. 8 illustrates an example mobile device platform.

The client-side functionality described above can be implemented as a series of instructions stored on a computer-readable storage medium that, when executed, cause a programmable processor to implement the operations described above. While the client device 122 may be implemented in a variety of different hardware and computing systems, FIG. 8 shows a schematic representation of the main components of an example computing platform of a client or mobile device, according to various particular embodiments. In particular embodiments, computing platform 802 may comprise controller 804, memory 806, and input output subsystem 810. In particular embodiments, controller 804 which may comprise one or more processors and/or one or more microcontrollers configured to execute instructions and to carry out operations associated with a computing platform. In various embodiments, controller 804 may be implemented as a single-chip, multiple chips and/or other electrical components including one or more integrated circuits and printed circuit boards. Controller 804 may optionally contain a cache memory unit for temporary local storage of instructions, data, or computer addresses. By way of example, using instructions retrieved from memory, controller 804 may control the reception and manipulation of input and output data between components of computing platform 802. By way of example, controller 804 may include one or more processors or one or more controllers dedicated for certain processing tasks of computing platform 802, for example, for 2D/3D graphics processing, image processing, or video processing.

Controller 804 together with a suitable operating system may operate to execute instructions in the form of computer code and produce and use data. By way of example and not by way of limitation, the operating system may be Windows-based, Mac-based, or Unix or Linux-based, or Symbian-based, among other suitable operating systems. The operating system, other computer code and/or data may be physically stored within memory 806 that is operatively coupled to controller 804.

Memory 806 may encompass one or more storage media and generally provide a place to store computer code (e.g., software and/or firmware) and data that are used by computing platform 802. By way of example, memory 806 may include various tangible computer-readable storage media including Read-Only Memory (ROM) and/or Random-Access Memory (RAM). As is well known in the art, ROM acts to transfer data and instructions uni-directionally to controller 804, and RAM is used typically to transfer data and instructions in a bi-directional manner. Memory 806 may also include one or more fixed storage devices in the form of, by way of example, hard disk drives (HDDs), solid-state drives (SSDs), flash-memory cards (e.g., Secured Digital or SD cards, embedded MultiMediaCard or eMMD cards), among other suitable forms of memory coupled bi-directionally to controller 804. Information may also reside on one or more removable storage media loaded into or installed in computing platform 802 when needed. By way of example, any of a number of suitable memory cards (e.g., SD cards) may be loaded into computing platform 802 on a temporary or permanent basis.

Input output subsystem 810 may comprise one or more input and output devices operably connected to controller 804. For example, input output subsystem may include keyboard, mouse, one or more buttons, thumb wheel, and/or, display (e.g., liquid crystal display (LCD), light emitting diode (LED), Interferometric modulator display (IMOD), or any other suitable display technology). Generally, input devices are configured to transfer data, commands and responses from the outside world into computing platform 802. The display is generally configured to display a graphical user interface (GUI) that provides an easy to use visual interface between a user of the computing platform 802 and the operating system or application(s) running on the mobile device. Generally, the GUI presents programs, files and operational options with graphical images. During operation, the user may select and activate various graphical images displayed on the display in order to initiate functions and tasks associated therewith. Input output subsystem 810 may also include touch based devices such as touch pad and touch screen. A touchpad is an input device including a surface that detects touch-based inputs of users. Similarly, a touch screen is a display that detects the presence and location of user touch inputs. Input output system 810 may also include dual touch or multi-touch displays or touch pads that can identify the presence, location and movement of more than one touch inputs, such as two or three finger touches.

In particular embodiments, computing platform 802 may additionally comprise audio subsystem 812, camera subsystem 812, wireless communication subsystem 817, sensor subsystems 817, and/or wired communication subsystem 820, operably connected to controller 804 to facilitate various functions of computing platform 802. For example, Audio subsystem 812, including a speaker, a microphone, and a codec module configured to process audio signals, can be utilized to facilitate voice-enabled functions, such as voice recognition, voice replication, digital recording, and telephony functions. For example, camera subsystem 812, including an optical sensor (e.g., a charged coupled device (CCD), or a complementary metal-oxide semiconductor (CMOS) image sensor), can be utilized to facilitate camera functions, such as recording photographs and video clips. For example, wired communication subsystem 820 can include a Universal Serial Bus (USB) port for file transferring, or a Ethernet port for connection to a local area network (LAN).

Wireless communication subsystem 817 can be designed to operate over one or more wireless networks, for example, a wireless PAN (WPAN) (such as, for example, a BLUETOOTH WPAN, an infrared PAN), a WI-FI network (such as, for example, an 802.11a/b/g/n WI-FI network, an 802.11s mesh network), a WI-MAX network, a cellular telephone network (such as, for example, a Global System for Mobile Communications (GSM) network, an Enhanced Data Rates for GSM Evolution (EDGE) network, a Universal Mobile Telecommunications System (UMTS) network, and/or a Long Term Evolution (LTE) network). Additionally, wireless communication subsystem 817 may include hosting protocols such that computing platform 802 may be configured as a base station for other wireless devices.

Sensor subsystem 817 may include one or more sensor devices to provide additional input and facilitate multiple functionalities of computing platform 802. For example, sensor subsystems 817 may include GPS sensor for location positioning, altimeter for altitude positioning, motion sensor for determining orientation of a mobile device, light sensor for photographing function with camera subsystem 814, temperature sensor for measuring ambient temperature, and/or biometric sensor for security application (e.g., fingerprint reader).

In particular embodiments, various components of computing platform 802 may be operably connected together by one or more buses (including hardware and/or software). As an example and not by way of limitation, the one or more buses may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, a Universal Asynchronous Receiver/Transmitter (UART) interface, a Inter-Integrated Circuit ($I^2C$) bus, a Serial Peripheral Interface (SPI) bus, a Secure Degital (SD) memory interface, a MultiMediaCard (MMC) memory interface, a Memory Stick (MS) memory interface, a Secure Digital Input Output (SDIO) interface, a Multi-channel Buffered Serial Port (McBSP) bus, a Universal Serial Bus (USB) bus, a General Purpose Memory Controller (GPMC) bus, a SDRAM Controller (SDRC) bus, a General Purpose Input/Output (GPIO) bus, a Separate Video (S-Video) bus, a Display Serial Interface (DSI) bus, an Advanced Microcontroller Bus Architecture (AMBA) bus, or another suitable bus or a combination of two or more of these. Additionally, computing platform 802 may be powered by power source 832.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a MultiMediaCard (MMC) card, an embedded MMC (eMMC) card, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of processor 802 (such as, for example, one or more internal registers or caches), one or more portions of memory 804, one or more portions of storage 806, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, JavaScript, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising, by one or more processors of a social-networking system:
    accessing, by one or more of the processors, social-networking information of a user from a data store of the social-networking system;
    receiving, from a client system of the user, a location associated with the user; and
    calculating, by one or more of the processors, a novelty score of the location for the user, wherein the novelty score is inversely related to an estimate of a familiarity of the user with the location, the estimated familiarity being based on the accessed social-networking information of the user.

2. The method of claim 1, further comprising, by one or more computing devices, surfacing one or more pieces of content to the user based at least in part on the novelty score.

3. The method of claim 2, further comprising, by one or more computing devices, ranking the pieces of content based at least in part on one or more of:
    one or more distances between the location and one or more locations associated with one or more of the pieces of content;
    one or more engagement levels associated with one or more of the pieces of content; or
    one or more social coefficients between the user and one or more other users of the social-networking system associated with one or more of the pieces of content.

4. The method of claim 2, wherein surfacing the pieces of content to the user comprises delivering the pieces of content in the form of:
    one or more news feeds;
    one or more photo slideshows configured to replace one or more default screens of a mobile computing device of the user; or
    one or more maps comprising one or more pins designating one or more locations associated with one or more of the pieces of content.

5. The method of claim 1, wherein the location associated with the user is a current location of the user.

6. The method of claim 1, wherein the location associated with the user is a predicted future location of the user.

7. The method of claim 1, wherein the location is determined based at least in part on one or more of:
    one or more events associated with the user;
    one or more photographs uploaded to the social-networking system by the user;
    one or more photographs uploaded to the social-networking system that are associated with one or more tags associated with the user; or
    Global Positioning System (GPS) data from a mobile computing device of the user.

8. The method of claim 1, wherein the social-networking information of the user comprises information associated with one or more of:
    demographics;
    communication channels;
    personal interests;
    social-graphs;
    locations;
    photographs;
    videos;
    stories;
    reviews;
    news entries;
    links;
    events;
    audio;
    deals;
    promotions;
    ads;
    activities;
    calendars;
    events;
    privacy settings;
    check-ins;
    Global Positioning System (GPS) data;
    tags;
    comments;
    time stamps;
    time data; or
    data associated with social-networking services.

9. The method of claim 1, wherein the estimate of the familiarity of the user with the location is based at least in part on one or more of:
    a distance between the location and a location previously associated with the user;
    an amount of time the user has previously spent at the location; or
    the social-networking information.

10. The method of claim 2, wherein calculating a novelty score of the location for the user comprises determining one or more of:
    a geographic area associated with the location; or
    a temporal radius associated with the location; and
    wherein surfacing one or more pieces of content to the user comprises retrieving one or more of the pieces of information based at least in part on one or more of the geographic area or the temporal radius.

11. One or more computer-readable non-transitory storage media embodying software that is operable when executed to:
  access, by one or more processors of a social-networking system, social-networking information of a user from a data store of the social-networking system;
  receive, from a client system of the user, a location associated with the user; and
  calculate, by one or more of the processors, a novelty score of the location for the user, wherein the novelty score is inversely related to an estimate of a familiarity of the user with the location, the estimated familiarity being based on the accessed social-networking information of the user.

12. The media of claim 11, wherein the software is further operable when executed to surface one or more pieces of content to the user based at least in part on the novelty score.

13. The method of claim 12, wherein the software is further operable when executed to rank the pieces of content based at least in part on one or more of:
  one or more distances between the location and one or more locations associated with one or more of the pieces of content;
  one or more engagement levels associated with one or more of the pieces of content; or
  one or more social coefficients between the user and one or more users of the social-networking system associated with one or more of the pieces of content.

14. The media of claim 12, wherein the software is further operable when surfacing the pieces of content to the user to deliver the pieces of content in the form of:
  one or more news feeds;
  one or more photo slideshows configured to replace one or more default screens of a mobile computing device of the user; or
  one or more maps comprising one or more pins designating one or more locations respectively associated with one or more of the pieces of content.

15. The media of claim 11, wherein the location associated with the user is a current location of the user.

16. The media of claim 11, wherein the location associated with the user is a predicted future location of the user.

17. The media of claim 11, wherein the location is determined based at least in part on:
  one or more events associated with the user;
  one or more photographs uploaded to the social-networking system by the user;
  one or more photographs uploaded to the social-networking system that are associated with one or more tags associated with the user; or
  Global Positioning System (GPS) data from a mobile computing device of the user.

18. The media of claim 11, wherein the estimate of the familiarity of the user with the location is based at least in part on one or more of:
  a distance between the location and a location previously associated with the user;
  an amount of time the user has previously spent at the location; or
  the social-networking information.

19. The media of claim 12, wherein the software is further operable when calculating a novelty score of the location for the user to determine one or more of:
  a geographic area associated with the location; or
  a temporal radius associated with the location; and
  wherein the software is further operable when surfacing one or more pieces of content to the user to retrieve one or more of the pieces of information based at least in part on one or more of the geographic area or the temporal radius.

20. A system comprising: one or more processors of a social-networking system; and a memory coupled to the processors comprising instructions executable by the processors, the processors being operable when executing the instructions to:
  access, by one or more of the processors, social-networking information of a user from a data store of the social-networking system;
  receive, from a client system of the user, a location associated with the user; and
  calculate, by one or more of the processors, a novelty score of the location for the user, wherein the novelty score is inversely related to an estimate of a familiarity of the user with the location, the estimated familiarity being based on the accessed social-networking information of the user.

* * * * *